United States Patent [19]

Asai et al.

[11] 4,005,489
[45] Jan. 25, 1977

[54] TAPE-OPERATING APPARATUS ADAPTED FOR USE EITHER WITH AN ENDLESS LOOP TYPE OR A COPLANAR TYPE CASSETTE

[75] Inventors: Satosi Asai, Annaka; Isamu Matsuki, Maebashi, both of Japan

[73] Assignee: Matsuki-Seisakusho, Maebashi, Japan

[22] Filed: June 26, 1975

[21] Appl. No.: 590,474

[30] Foreign Application Priority Data

Oct. 31, 1974 Japan .......................... 49-125766

[52] U.S. Cl. ................................................. 360/94
[51] Int. Cl.² ................... G11B 15/00; G11B 21/00
[58] Field of Search ................................ 360/94, 96

[56] References Cited

UNITED STATES PATENTS

| | | | |
|---|---|---|---|
| 3,561,767 | 2/1971 | Negishi | 360/94 |
| 3,593,946 | 7/1971 | Shardlow | 360/94 |
| 3,594,008 | 7/1971 | Takagi et al. | 360/94 |
| 3,703,295 | 11/1972 | Yamamoto | 360/94 |

*Primary Examiner*—Robert S. Tupper
*Attorney, Agent, or Firm*—Steele & Petock

[57] ABSTRACT

A tape-operating apparatus adapted for use either with an endless loop type cartridge or a coplanar type cassette which comprises a movable frame carrying cassette tape operating means including a magnetic head and a lock mechanism for keeping the movable frame in an operative position, wherein the lock mechanism is operatively coupled to cartridge tape track-changing means, and the movable frame is disengaged from the lock mechanism when the cartridge tape track-changing means is put into operation.

5 Claims, 18 Drawing Figures

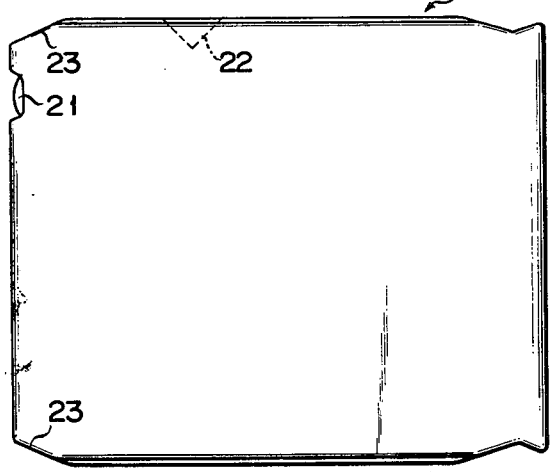
FIG. 1A
FIG. 1B
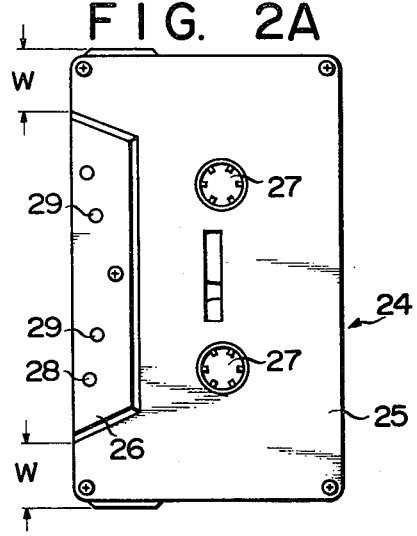
FIG. 2A
FIG. 2B
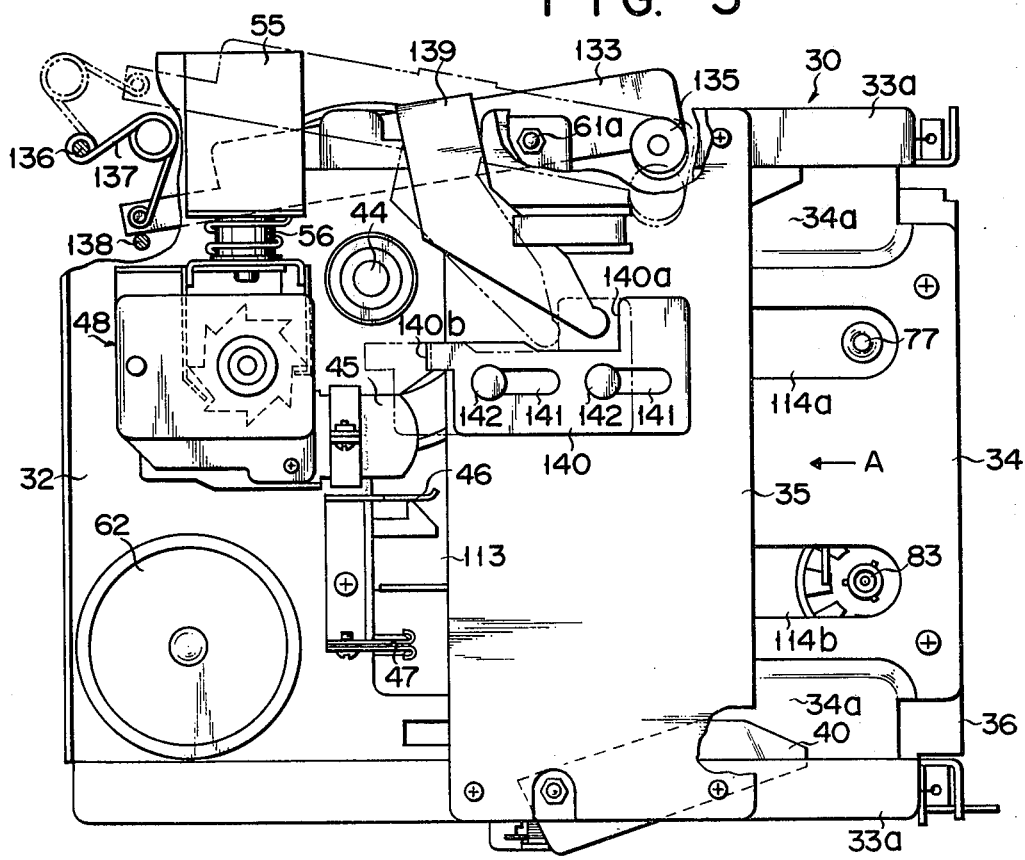
FIG. 3

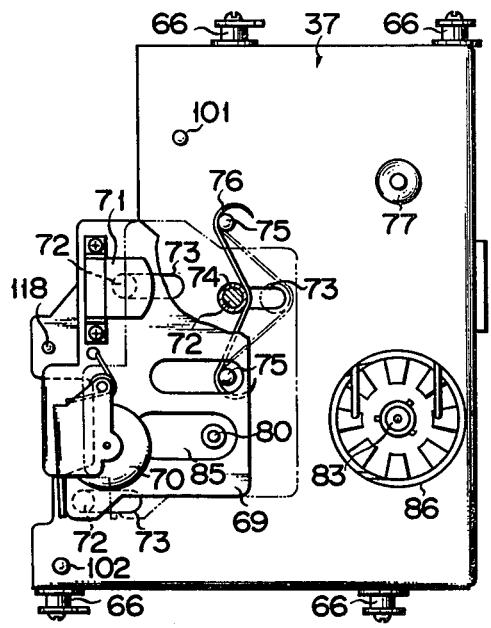
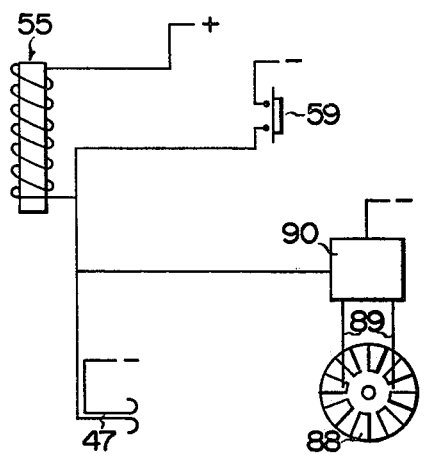
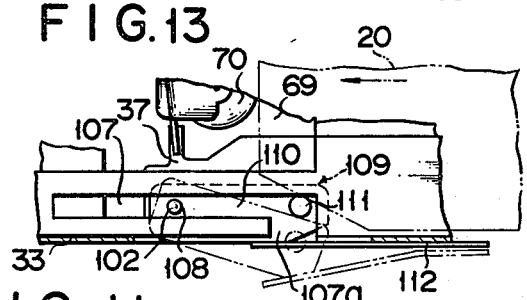
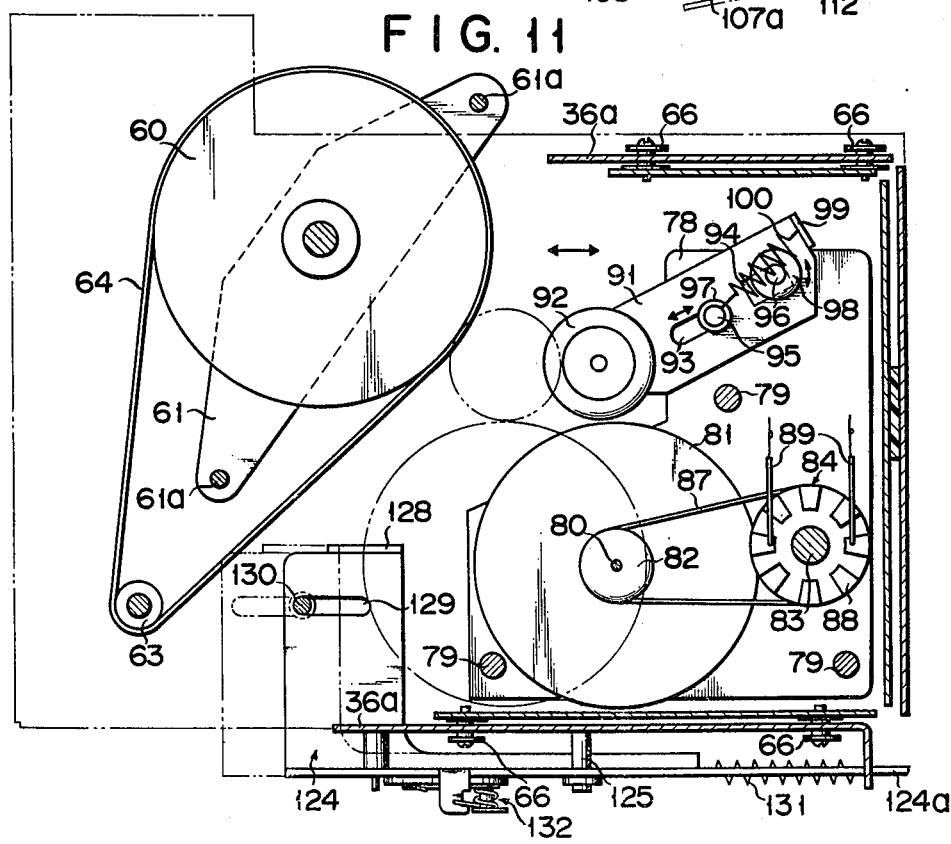

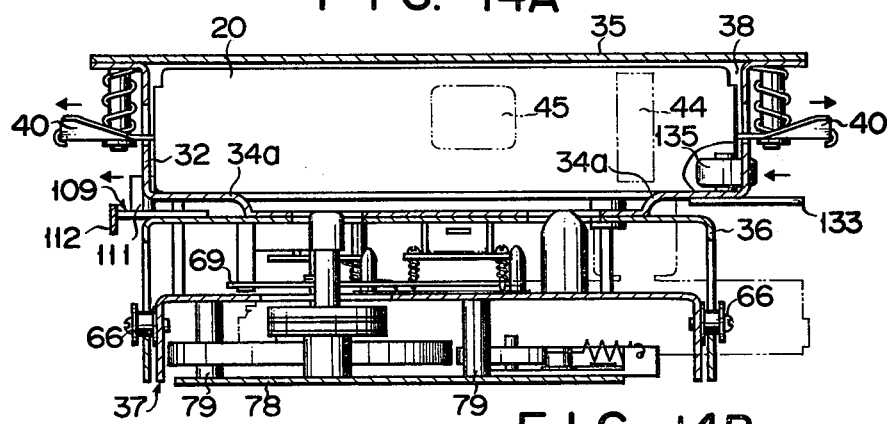
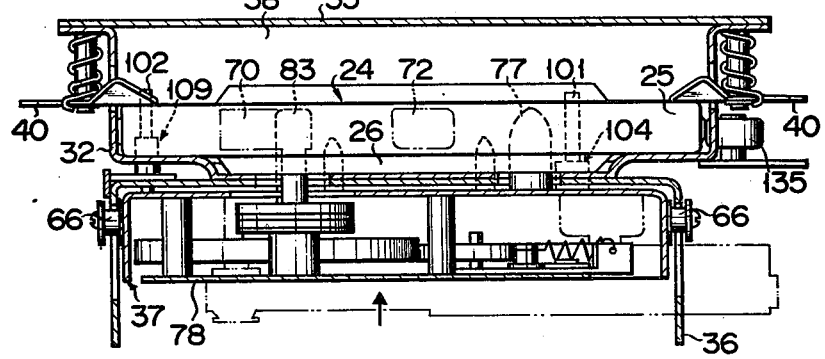
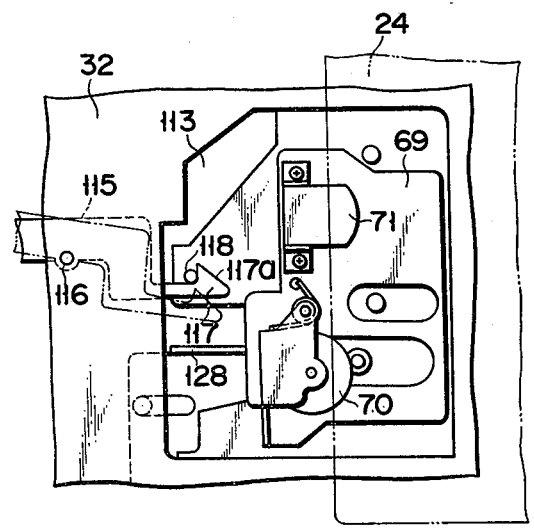

4,005,489

TAPE-OPERATING APPARATUS ADAPTED FOR USE EITHER WITH AN ENDLESS LOOP TYPE OR A COPLANAR TYPE CASSETTE

BACKGROUND OF THE INVENTION

This invention relates to a tape-operating apparatus for recording and/or reproduction of sounds which is adapted for use either with an endless loop type cartridge or a coplanar type cassette.

Ordinary compact magnetic tape holders are broadly divided into an endless loop type cartridge and coplanar type cassette. Both types of magnetic tape holder have different characteristics and shapes, requiring separate sound recording and reproducing devices, as has been the case in the past. If a single tape-operating device could be developed which is adapted for use with both types of magnetic tape, then recording and reproduction of sounds by means of a magnetic tape received in the cartridge and cassette would be effected very conveniently. Under the present circumstances, however, an attempt to incorporate two forms of sound recording and reproducing function in a single device, then such device would be rendered bulky and complicated in mechanical setup, giving rise to difficulties in operation.

SUMMARY OF THE INVENTION

It is accordingly an object of this invention to provide a compact tape-operating apparatus of simple arrangement for recording and/or reproducing sounds which is adapted for use either with an endless loop type cartridge or a coplanar type cassette.

Another object of the invention is to provide an inexpensive tape-operating apparatus of simple arrangement for recording and/or reproducing sounds, wherein the cassette tape-operating means can be brought to an inoperative position when cartridge tape-operating means is actuated.

A tape-operating apparatus for recording and/or reproducing sounds (hereinafter simply referred to as a "tape-operating apparatus") according to this invention comprises means for changing over the tracks of the cartridge tape; a movable frame carrying cassette tape-operating means and capable of being shifted between operative and inoperative positions; and lock mechanism for keeping the movable frame in an operative position. The lock mechanism is designed to disengage the movable frame by the action of the cartridge tape track-changing means.

Ordinary cartridge tape-operating means is unfailingly provided with means for changing over the tracks of the cartridge tape. With the tape-operating apparatus of this invention, the movable frame is released by said tape track-changing means, eliminating the necessity of providing particular means for releasing the movable frame.

BRIEF DESCRIPTION OF THE DRAWING

FIGS. 1A and 1B are miniature plan and side views of a typical endless loop type cartridge;
FIGS. 2A and 2B are miniature plan and side views of a typical coplanar type cassette;
FIG. 3 is a plan view, partly in section, of the tape-operating apparatus of this invention;
FIG. 9 is an oblique view of tape tracking-changing means;
FIG. 10 schematically illustrates a solenoid-exciting circuit;
FIG. 11 is a sectional view on line 11—11 of FIG. 4;
FIG. 12 is a plan view of a movable frame;
FIG. 13 is a plan view, partly in section, of the apparatus, showing a second actuating member;
FIGS. 14A and 14B present the inserted cartridge and cassette, as viewed in the direction in which they are pushed into the subject apparatus;
and
FIG. 15 is a fractional plan view of the apparatus showing the movable frame supported on a lock mechanism.

DETAILED DESCRIPTION OF THE INVENTION

Figure 4:
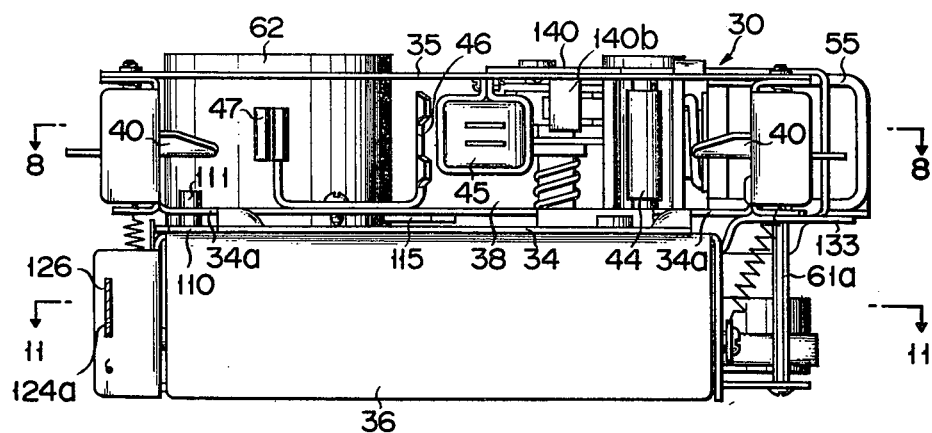
FIG. 4 is a right side view of the same.

FIGS. 1A and 1B jointly set forth the known endless loop type cartridge 20 ("Lear Jet" 8-track cartridge). The cartridge 20 containing a pinch roller 21 has substantially flat upper and lower surfaces. A depression 22 is cut out with a V-shaped cross section in one lengthwise side of the cartridge 20 to receive the later described press roller. A pair of chamfered portions 23 are formed at both corners of the insertion or forward side of the cartridge 20.

FIGS. 2A and 2B jointly show the known coplanar type cassette 24. The cassette 24 consists of a body 25 for receiving a tape reel and a thicker portion 26 into which a magnetic head and pinch roller are fitted in application. The thicker portion 26 is extensively formed over the lengthwise center of the cassette 24 at an interval W from both crosswise sides thereof and is raised to a height S from the upper and lower surfaces of the body 25. The body 25 is bored with holes 27 for insertion of reel shafts, and the thicker portion 26 is bored with holes 28, 29 for insertion of a capstan and set pins. The cassette 24 has a lengthwise width substantially equal to the crosswise width of the cartridge 20 and a smaller thickness and length than the cartridge 20.

Figure 5:
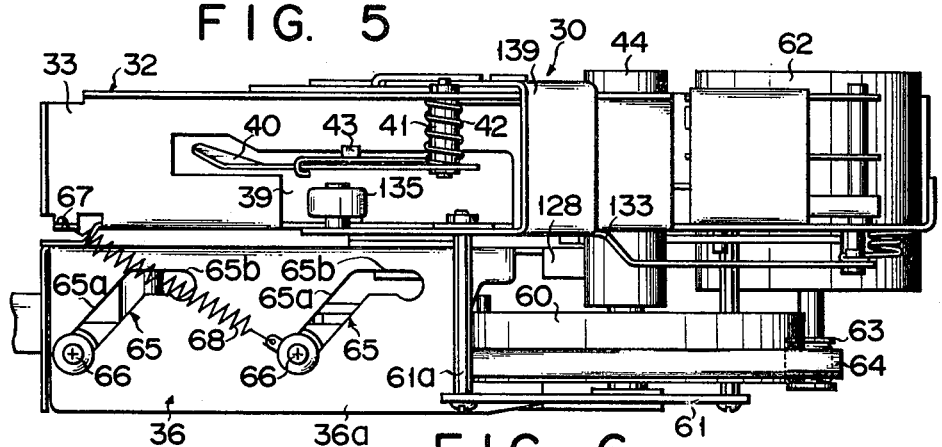
FIG. 5 is a back view of the same.
Figure 6:
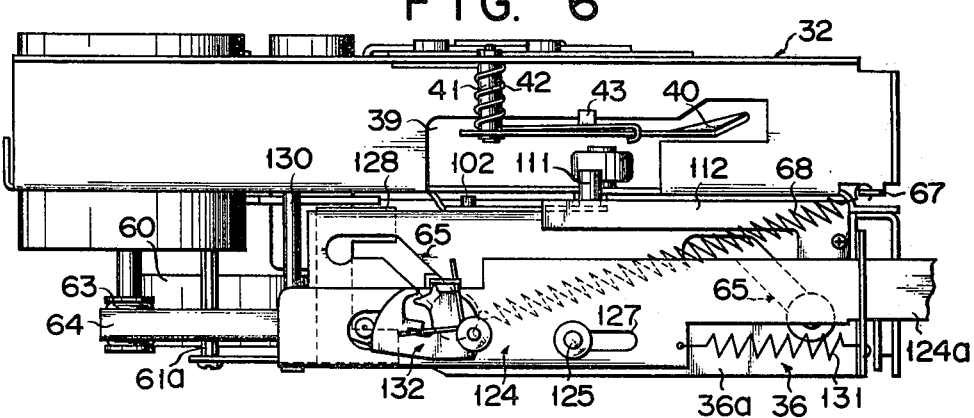
FIG. 6 is a front view of the same.
Figure 7:
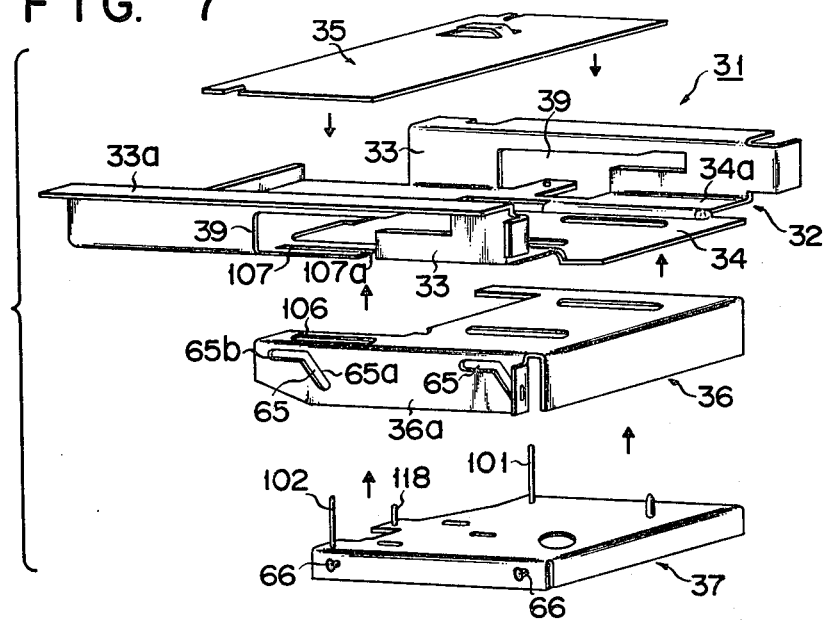
FIG. 7 is a miniature exploded view of a frame assembly.
Figure 8:
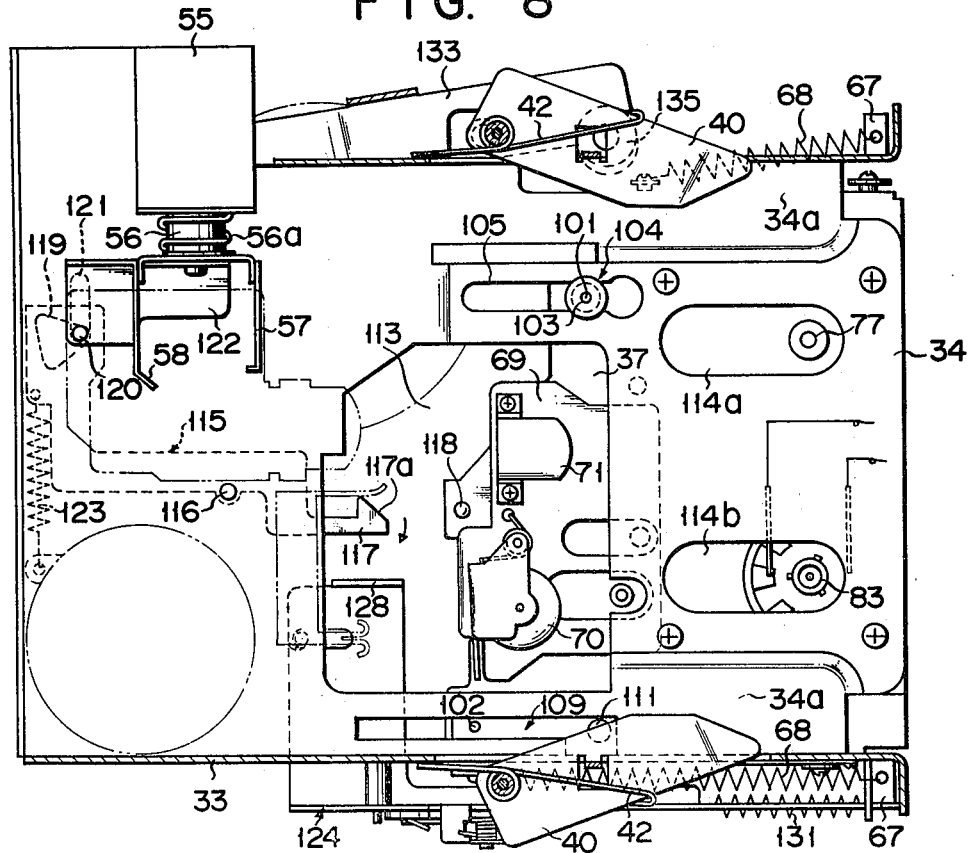
FIG. 8 is a sectional view on line 8—8 of FIG. 4.

The tape-operating apparatus of this invention is constructed in consideration of the different shapes and functions of the cartridge and cassette. FIGS. 3 to 6 present a compact tape-operating apparatus used, for example, with automobiles. The tape-operating apparatus has a frame assembly 31, which consists of an upper frame unit 32 having a pair of upright parallel lengthwise walls with a bottom plate 34 placed therebetween, an upper plate 35 screwed to the flaps 33a formed on the lengthwise walls 33 of the upper frame unit 32 and a lower frame unit 36 screwed to the upper frame unit 32. The later described movable frame 37 is movably fitted to the lower frame unit 36 (FIG. 7). The upper frame unit 32 and upper plate 35 jointly define a common free space 38 (FIG. 4) for admission of the cartridge 20 and cassette 24. The width of the free space 38, namely, an interval between both lengthwise walls of the upper frame unit 32 is made substantially equal to the insertion width of the cartridge 20 and cassette 24. The bottom plate 34 of the upper frame unit 32 has a pair of raised portions 34a which extend parallel at an interval substantially equal to the lengthwise width of the thicker portion 26 of the cassette 24, and are raised from the upper surface of the main part of the bottom plate 34 to a height substantially equal to the height S of the thicker portion 26 of the cassette 24. An interval between the upper plane of the raised portions 34a and the underside of the upper plate 35 is made substantially equal to the thickness of the cartridge 20. Each lengthwise wall 33 of the upper frame unit 32 is bored with a hole 39 in which a plate-like guide member 40 is placed (FIGS. 5, 6 and 8). The guide member 40 is fitted at one end to the lower end of a support rod 41 movably and in a horizontal direction, and is urged into the free space 38 through the hole 39 by a torsion coil spring 42 for engagement with the lengthwise wall 33 of the upper frame unit 32 through a stopper 43. An interval between the underside of the guide member 40 and upper plane of the corresponding raised portion 34a is made substantially equal to the thickness of the cassette body 25.

Cartridge tape-operating means including a capstan 44, magnetic head 45, tape guide 46 and conductor 47 is provided in the forward portion of the upper frame unit 32 as viewed in the direction indicated by the arrow A of FIG. 3, namely, in the direction in which the cartridge 20 is pushed into the free space 38 (FIGS. 3 and 4). It will be noted that the terms "forward portion" and "rear portion" are defined to mean those as viewed in the direction in which the cartridge 20 and cassette 24 are inserted into the free space 38.

The magnetic head 45 is fitted to the known tape track-changing mechanism 48 mounted on the upper frame unit 32. The tape track-changing mechanism 48 consists of a ratchet 49 and the known stepped cam surface 51 formed on the underside thereof. A plate 52 holding the magnetic head 45 is slidably fitted to a fixed shaft 50 and urged upward by a compression spring 53. The plate 52 has pins 54 engageable with the stepped cam surface 51 and are moved vertically by cooperation between the stepped cam surface 51 and pin 54 when the ratchet 40 rotates. A solenoid 55 (FIG. 8) fixed to the upper frame unit 32 has a rod 56, which has a pawl 57 and a stop arm 58 engaging the teeth of the ratchet 49. The rod 56 which is normally urged by a compression spring 56a is retracted upon excitation of the solenoid 55 to rotate the ratchet 49 for a distance corresponding to one tooth thereof by the pawl 57. The solenoid 55 is excited when a metal foil attached to the cartridge tape touches the conductor 47 and also when a switch 59 is actuated (FIG. 10). The tracks of the cartridge tape can be freely changed over by the closing of the switch 59.

The capstan 49 penetrates the upper frame unit 32 and is provided at the lower end with a fly-wheel 60 (FIG. 11). The upper frame unit 32 is fitted with the known electric motor 62, the rotary shaft of which extends below the upper frame unit 32 and is provided at the lower end with a pulley 63. A rubber belt 64 is operatively stretched between the pulley 63 and fly-wheel 60.

Both lengthwise walls 36a of the lower frame unit 36 are each bored with two guide slots 65 of substantially the same shape. The guide slot 65 consists of an inclined portion 65a rising obliquely upward and a horizontal portion 65b horizontally extending from the upper end of the inclined portion 65a. The movable frame 37 disposed below the lower frame unit 36 is supported movably and in a horizontal position by guide rollers 66 engaging the guide slots 65. A pair of tension springs 68 stretched between the paired forward guide rollers 66 and lugs 67 cooperate to urge the movable frame 37 to the rearmost and lowermost inoperative position. The movble frame 37 is fitted with the under mentioned cassette tape-operating means. A movable plate 69 is disposed in the forward portion of the movable frame 37 to hold a cassette tape pinch roller 70 and magnetic head 71. The movable plate 69 has support rods 72 slidably engaging elongate guide slots 73 formed in the movable frame 37, and spaced at a prescribed interval from the upper surface of the movble frame 37 by spacer rings 74 surrounding the support rods 72. The movable frame 37 is fitted with a pair of cassette-setting pins 75, across which a wire spring 76 is stretched. The wire spring 76 is pressed at the center against one of the support rods 72 to urge forward the movable plate 69. The movable frame 37 has an upward projecting fixed cassette tape reel shaft 77.

A bottom plate 78 is fixed below the movable frame 37 (FIG. 11). Rotatably supported on the bottom plate 78 are a cassette tape capstan 80 and a takeup reel shaft 83 fitted with a pulley 84. The capstan 80 and takeup reel shaft 83 project upward through the movable frame 37. A belt 87 is operatively stretched between the pulleys 82, 84. An electroconductive disk 88 having a plurality of insulation segments is mounted on the upper surface of the pulley 84 of the takeup reel shaft 83. The disk 88 is contacted by a pair of contact arms 89, which intermittently supply pulse signals to the known solenoid-exciting circuit 90 (FIG. 10) according to the rotation of the pulley 84. The solenoid-exciting circuit 90 energizes the solenoid 55 when the pulley 84 is brought to rest, namely, when pulse signals cease to be generated. A support plate 91 carrying a rubber idler 92 is mounted on the bottom plate 82. The idler 92 operatively couples both wheels 60, 81 together when the cassette 24 is inserted into the free space 38.

The tape-operating apparatus of this invention comprises actuating means for bringing the movable frame 37 together with the cassette tape pinch roller 70, magnetic head 71 and capstan 80 to an operative position. A pair of forwarding pins 101, 102 project upward from the movable frame 37, as shown in FIG. 12. One forwarding pin 101 is inserted into the central hole of the first actuating member 104 slidably engaging an elongate slot 105 formed in the bottom plate 34 of the upper frame unit 32 (FIG. 8). The other forwarding pin 102 is inserted into the through hole 108 of the second actuating member 109 slidably resting on the lower frame unit 36 (FIG. 13). The second actuating member 109 has an engagement pin 111 projecting upward through a slot 107, and is urged into the frame assembly 31 by a relatively weak plate spring 112.

The engagement pin 111 is so disposed as to be pressed against the chamfered portion 23 formed at the corner of the insertion side of the cartridge 20 when it is inserted into the free space 38. The slot 107 is provided with an escapement slot 107a for allowing the engagement pin 111 to be forced out of the free space 38 when the cartridge 20 is pushed thereinto.

The tape-operating apparatus of this invention further comprises a lock mechanism for keeping the movable frame 37 in an operative position. The lock mechanism includes a lock arm 115 rotatably fitted to the underside of the upper frame unit 32 by a pin 116. The lock arm 115 is provided at one end with a pawl 117, which has a shape portion 117a for ready engagement with a pin 118 fixed to the forward portion of the movable frame 37. The lock arm 115 is provided at the opposite end with an engagement hole 119, into which a pin 120 penetrating a slot 121 formed in the upper frame unit 32 is fitted. The pin 120 is formed on a support member 122 (FIG. 8) fitted to the rod 56 of the solenoid 55 so as to swing the lock arm 115 clockwise when the rod 56 is retracted. A tension spring 123 engaging the opposite end of the lock 115 urges said arm 115 counterclockwise.

The tape-operaitng apparatus of this invention further comprises a tape-fast forwarding arm 124 which is provided with a stopper 128 for the movable plate 69 of the movable frame 37. The tape-fast forwarding arm 124 is so supported on the lower frame unit 36 as to be shifted lengthwise between the solid line position (normal position) of FIG. 11 and the chain line position thereof (tape-fast forwarding position).

The tape-operating apparatus of this invention further comprises a cartridge-pressing mechanism, which is formed, as shown in FIG. 3, of a support plate 133 rotatably mounted on the upper frame unit 32 by a rod 61a and a press roller 135 fitted to the support plate 133. The support plate 133 which is normally kept in the solid line position of FIG. 3 (an inoperative position) by a torsion coil spring 137 is shifted to the chain line position of FIG. 3 (an operative position) when the inserted cartridge 20 pushes forward the projection 140b (FIGS. 3 and 4) of the movable plate 140 which engages an arm 139 formed on the support plate 133.

There will now be described the operation of the subject tape-operating apparatus. When the cartridge 20 is pushed into the free space 38 in the direction indicated by the arrow A of FIG. 3, then both guide members 40 are forced out of the free space 38 by the inserted cartridge 20 to guide its lengthwise sides. At this time, the engagement pin 111 of the second movable member 109 is pushed out into the escapement slot 107a against the force of the spring 112 by the chamfered portion 23 formed at the corner of the insertion or forward side of the cartridge 20 (as shown in a chain line in FIG. 13). The cartridge 20 which is now placed on the raised portions 34a of the bottom plate 34 of the upper frame unit 32 passes over the first actuating member 104 without touching it, keeping the movable frame 37 in an operative position. When the cartridge 20 moves further into the free space 38, then the forward end face of the cartridge 20 pushes forward the projection 140b to bring the press roller 135 to the chain line position of FIG. 3. As the result, the press roller 135 is tightly fitted into the depression 22 of the cartridge 20, causing the cartridge tube to be firmly pressed against the capstan 44, tape guide 46 and conductor 47. At this time, the forward end of the inserted cartridge 20 actuates a known switch means (not shown) and in consequence a sound recording and reproducing circuit (not shown). When the switch 59 (FIG. 10) is thrown in with a desire to change over the track of the cartridge tape now in use to any other one, then the solenoid 55 is excited to lift or bring down the magnetic head 45, as the case may be. When the cartridge 20 is pulled out upon completion of the operation of the tape, the press roller 135 is brought back to the solid line position of FIG. 3 by the inner walls of the aforesaid V-shaped depression 22 of the cartridge 20. At this time the known switch means (not shown) is automatically thrown open.

When the cassette 24 is inserted into the free space 38 in the direction indicated by the arrow A of FIG. 3, then the guide members 40 guide the upper surface of the body 25 of the cassette 24. The body 25 and thicker portion 26 of the cassette 24 are pressed against the second and first actuating members 109, 104 respectively, causing the movable frame 37 to be lifted obliquely upward its horizontal position still kept along the inclined portions 65a of the guide slots 65. When the movable frame 37 reaches the uppermost end of the inclined portion 65a, the capstans and reel shafts 77, 83 enter the corresponding holes of the cassette 20. The pinch roller 70 and magnetic head 71 pass through the hole 113 of the upper frame unit 32 into the free space 38. The movable plate 69 abuts against the stopper 128 of the tape-fast forwarding arm 124. When the movable frame 37 is further carried along the horizontal portions 65b of the guide slots 65, the movable plate 69 is brought to rest by the stopper 128. The magnetic head 71 is pressed against the cassette tape, which is now clamped between the capstan 80 and pinch roller 70. The idler 92 advances with the movable frame 37 to abut against the fly-wheels 60, 81 for the coupling thereof. The pin 116 of the movable frame 37 is pressed against the pawl 117 of the lock arm 115 to be locked thereby in the most advanced position (FIG. 15). Upon advance of the movable frame 37, the forwarding pin 102 projecting through the hole 108 of the second actuating member 109 energizes a known switch means (not shown) and in consequence sound recording and reproducing circuit (not shown). While the tape takeup reel shaft 83 is rotated, the pulse signals are continuously transmitted from the contact arm 89 to the solenoid-exciting cicuit 90.

When the cassette tape is wound about the takeup reel shaft 83 to the full, then said shaft 83 is brought to rest by the tension of that terminal portion of the tape which is stretched between both reel shafts 83, causing pulse signals to cease to be generated. The solenoid-exciting circuit 90 actuates the solenoid 55, causing the lock arm 115 to rotate clockwise by the pin 120 to the chain line position of FIG. 15 for release of the pin 116. The movable frame 37 is brought back to the inoperative position by the tension springs 68. The cassette is pushed backward by the actuating members 104, 109. The known switch means (not shown) is automatically thrown open and the lock arm 115 is returned to the solid line position of FIG. 15 by the tension spring 123.

When the switch 59 of the cartridge tape track-changing mechanism 48 is closed with a desire to release the cassette while its tape is still running, then the solenoid 55 is similarly excited to disengage the pin 116. It is possible to provide a releasing mechanism for mechanically swinging the lock arm 115 in addition to the aforesaid electromagnetic means.

What we claim is:

1. A magnetic tape recording and/or reproducing apparatus for selectively operating an endless type cartridge or coplanar type cassette, comprising:
    a main frame having a single space for receiving a cartridge or cassette:
    cartridge tape operating means mounted on said main frame and positioned to operate a cartridge inserted within said space, said cartridge tape operating means including cartridge tape transport means, a magnetic head, and head track changing means having a solenoid;
    a movable frame fitted with cassette-tape operating means including cassette tape transport means and a magnetic head;

means mounting the movable frame on the main frame for movement between a first position where the cassette-tape operating means is in said space and in operative position with a cassette therein and a second position where the cassett-tape operating means out of said space;

spring means urging the movable frame to the second position;

actuating means for shifting the movable frame to the first position against the urging of the spring means responsive to the insertion of a cassette into the space;

locking means for keeping the movable frame in the first position when the movable frame is shifted to the first position by the actuating means;

releasing means connected to the solenoid to release the locking means and allow the movable frame to be urged back to the first position responsive to the solenoid being energized; and an electric circuit means for energizing the solenoid.

2. A magnetic tape recording and/or reproducing apparatus according to claim 1, wherein the electric circuit means includes a manually operated switch means to energize the solenoid.

3. A magnetic tape recording and/or reproducing apparatus according to claim 1, wherein the electric circuit means includes means sensing the completion of the operation of the cassette tape transport means to energize the solenoid.

4. A magnetic tape recording and/or reproducing apparatus according to claim 1, wherein the locking means includes an engagement pin fixed to the movable frame, a locking arm swingably mounted on the main frame to be movable between a locking position where the locking arm is engaged with the engagement pin and an unlocking position where the locking arm is disengaged from the engagement pin and tension spring means for urging the locking arm to the locking position, said locking arm being so positioned as to be shifted and then engaged with the engagement pin during movement of the movable frame toward the first position.

5. A magnetic tape recording and/or reproducing apparatus according to claim 4, wherein said releasing means includes a member connected with the locking arm to move the locking arm to the unlocking position against the tension spring means responsive to the solenoid energized by the electric circuit means.

* * * * *